June 17, 1941.   R. N. STODDARD ET AL   2,245,837
BALLAST LAMP FOR STERILAMP
Filed Sept. 9, 1939
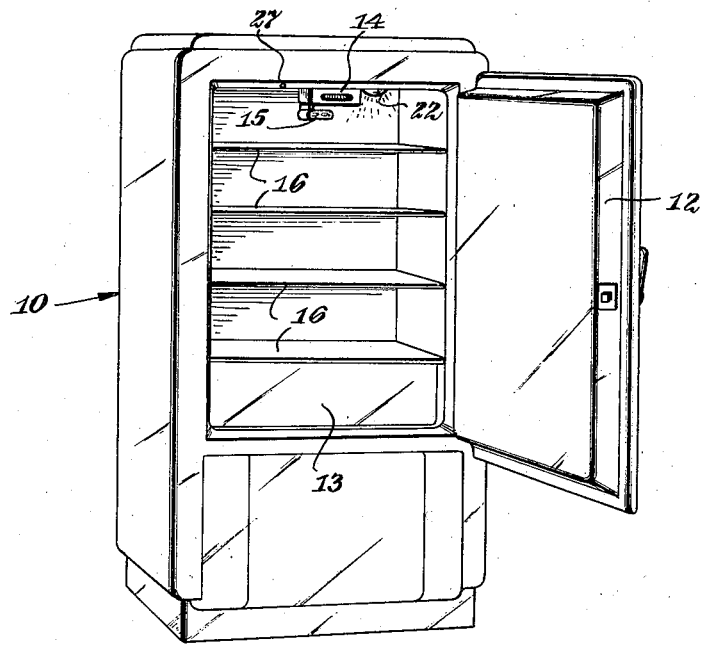
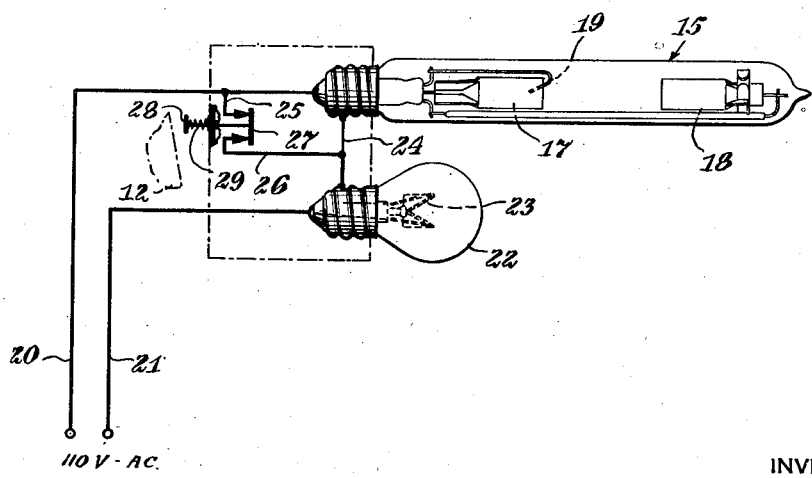
INVENTOR
R. N. STODDARD
A. R. DENNINGTON.
BY
ATTORNEY Patented June 17, 1941

2,245,837

UNITED STATES PATENT OFFICE 2,245,837

BALLAST LAMP FOR STERILAMP

Ralph N. Stoddard and Arthur R. Dennington, East Orange, N. J., assignors to Westinghouse Electric & Manufacturing Company, East Pittsburgh, Pa., a corporation of Pennsylvania Application September 9, 1939, Serial No. 294,082

7 Claims. (Cl. 201—63)

The invention relates to lamp circuits and especially to lamp circuits utilized in enclosures for preserving articles subject to spoilage, such as the household electric refrigerator.

An object of the invention is to provide an illuminating device for an electric refrigerator that will also act as a ballast resistance for a sterilizing lamp enclosed in the refrigerator.

Another object of the invention is to utilize the full brightness of the illuminating lamp when the door is open and the sterilizing lamp short-circuited.

Another object of the invention is to protect the eyes of persons looking into the refrigerator from the ultra-violet radiation of the sterilizing lamp.

A further object of the invention is to reduce the cost of installation of the illumination and sterilizing devices.

Other objects and advantages of the invention will become apparent from the following description and drawing in which:

Fig. 1 is a perspective view illustrating a household refrigerator for which the invention is especially adapted.

Fig. 2 is a view partially in elevation, of a sterilizing lamp and an illuminating lamp, and partially diagrammatic of the electrical connections thereto.

Heretofore, the ultra-violet sterilizing lamps installed in refrigerators have had a rather high resistance connected thereto. This resistance has been necessary to limit the current through the sterilizing lamp. The result has been, however, that the current through the lamp will vary with line voltage variations in a direct ratio thereto.

In certain types of refrigerators, the sterilizing lamp has been placed to effectively radiate to the food placed therein, with the result that the ultra-violet radiations would strike the eyes of a person looking into the refrigerator. This is especially true of children who would look up directly at the lamp when removing food from the shelves, or would look at the lamp out of curiosity, because of the unusual type of lamp structure and operation present in the sterilizing lamp.

It is an object of our invention to limit the cost of the resistance by utilizing the circuit of the illumination lamp provided for the refrigerator and to utilize the increased resistance of the filament of the illumination lamp with current to act as a ballest resistance for the discharge lamp. It is a very important object of the invention to utilize the full brightness of the illuminating lamp only when the door is open and at other times the comparatively cold resistance of the illuminating lamp is utilized. This last object is accomplished by having the door short-circuit the sterilizing discharge lamp when the refrigerator is open so that, in addition to this object, the eyes of the person opening the refrigerator will be protected from the ultra-violet radiation.

In Fig. 1 we have disclosed a household refrigerator of the type to which the invention is especially adapted, although the invention is adaptable for other types. This refrigerator 10 has the familiar enclosure with a door 12 therefor. The freezing compartment 13 is located in the bottom portion of the enclosure and the temperature of the enclosure is controlled by a regulation member 14 located in the upper portion of the enclosure. Directly below this regulation device 14, the sterilizing lamp member 15 is installed to direct its radiation throughout the perishable articles located on the shelves 16.

This sterilizing lamp is illustrated in Fig. 2, and is more particularly described in the copending application of Philip W. Blackburn, Ser. No. 272,966, filed May 11, 1939, for "Trigger for discharge devices."

This sterilizing lamp 15 preferably comprises two hollow closed end electrodes 17 and 18, facing each other, with their open ends approximately 1½" apart and having their interior coated with an electron emitting coating such as strontium, barium, or calcium oxide. A trigger or starting electrode 19 projects into one of the electrodes.

The atmosphere within the sterilizing lamp is mercury vapor, which may be carried by a noble gas such as argon or argon and neon. The pressure inside the casing is from 6 to 18 mm. of mercury, although the optimum range is from 10 to 15 mm. of mercury.

The sterilizing lamp is connected to the usual commercial circuit 20 and 21, which, while it is supposed to be 110 volts, sometimes varies from 105 to 125 volts. An illumination lamp 22, having a filament 23, is connected in series with the sterilizing lamp by means of a connection 24. This illumination lamp 22 is utilized to illuminate the enclosure 11 of the refrigerator. Connections 25 and 26 extend from the line 20 and the connection 24, respectively, to a switch or contact member 27 for the purpose of short-circuiting the discharge lamp. This switch 27 has a trigger 28 extending from the rim of the enclosure to be operated by the door 12, upon opening and closing. The trigger and contact 27 are held out of contact with the connections 25 and 26 by means of the door 12 when the refrigerator is closed. When the door 12 is open, the spring 29 will press the trigger 28 into contact with the connections 25 and 26 to short circuit the discharge sterilizing lamp.

It has been found that in the prior methods of installation utilizing a series resistor, the current through the discharge device will vary 16 milliamperes over a voltage variation from 105 to 125 volts. When a 15 or 7½ watt 115 volt lamp is utilized in series with the sterilizing lamp, as illustrated in Fig. 2, the current will vary only 7 milliamperes over the same line voltage variation. The use of the 15 or 7½ watt lamp as a ballast, therefore, reduces the variation in output of the sterilizing lamp from about 40% to approximately 20%.

The invention utilizes less apparatus by the elimination of the ballast resistance, and the installation and fixtures are simplified because the illuminating lamp is used in a dual capacity as a ballast resistance and as an illuminant. The operation of the sterilizing lamp is made more uniform as the current fluctuates less with changes in voltage than would be the case with a fixed resistance. The cost of installation is reduced, and there is absolute protection of the eyes of persons looking into the refrigerator when the door is open, as under these conditions the sterilizing lamp is short-circuited.

It is apparent that many modifications may be made in the preferred embodiment illustrated, and accordingly we desire only such limitations as are necessitated by the spirit and scope of the following claims.

We claim:

1. An enclosure for preserving articles subject to spoilage, a sterilizing discharge lamp therein, and an illuminating lamp having a filament connected in series with said discharge lamp, the resistance of said filament increasing with the increase of current therethrough, whereby the illuminating lamp acts as a ballast resistance for said discharge lamp, a closure member for an opening in said enclosure and means operated by said closure member for short-circuiting the sterilizing discharge lamp.

2. An enclosure for preserving articles subject to spoilage, a sterilizing discharge lamp therein, and an illuminating lamp having a filament connected in series with said discharge lamp, the resistance of said filament increasing with the increase of current therethrough, whereby the illuminating lamp acts as a ballast resistance for said discharge lamp, a closure member for an opening in said enclosure and means operated by the opening of said closure member for short-circuiting said discharge lamp whereby the current is increased in said illuminating lamp.

3. An enclosure, for preserving articles subject to spoilage, having an illuminating lamp member in said enclosure, a sterilizing lamp member electrically connected in series to said illuminating lamp member and normally utilizing in operation sufficient current to prevent full illumination of said illumination lamp member, a closure member for an opening in said enclosure and means operated by the opening of said closure member for short-circuiting said sterilizing lamp member whereby said illuminating lamp member attains full illumination.

4. An enclosure, for preserving articles subject to spoilage, having an illuminating lamp member having a filament which increases in resistance with current, a sterilizing lamp member which decreases in resistance with current serially connected to said illuminating lamp member, a closure member for an opening in said enclosure and means operated by said closure member for short-circuiting said sterilizing lamp member.

5. A lamp circuit for an enclosure for preserving articles subject to spoilage comprising an illumination device having a filament with resistance increasing with current continuously connected in said circuit, a sterilizing device, a closure member and means operated by the closing of said closure member for connecting said devices in series whereby the current is decreased in said illumination device.

6. A lamp circuit for an enclosure comprising a sterilizing lamp, an illuminating lamp in series therewith, a closure member for said enclosure and means operated by said closure member for short-circuiting the sterilizing lamp.

7. An enclosure containing an illuminating lamp having a filament with resistance increasing with current, an ultraviolet discharge lamp in series therewith and preventing incandescence of said filament while in series, closure means for said enclosure and means operated by said closure means for short-circuiting the ultraviolet lamp.

RALPH N. STODDARD.
ARTHUR R. DENNINGTON.